(12) United States Patent
Rennhack

(10) Patent No.: US 7,644,634 B2
(45) Date of Patent: Jan. 12, 2010

(54) DEVICE FOR DETERMINING THE ROTATION ANGLE OF A SHAFT IN AN AIRCRAFT

(75) Inventor: Joern Rennhack, Harsefeld (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 12/231,794

(22) Filed: Sep. 5, 2008

(65) Prior Publication Data
US 2009/0007623 A1    Jan. 8, 2009

Related U.S. Application Data

(63) Continuation of application No. 11/358,529, filed on Feb. 21, 2006, now Pat. No. 7,437,955.

(60) Provisional application No. 60/655,326, filed on Feb. 23, 2005.

(30) Foreign Application Priority Data

Feb. 23, 2005   (DE)   ................. 10 2005 008 331

(51) Int. Cl.
*G01L 25/00* (2006.01)
(52) U.S. Cl. ................................. 73/862.08
(58) Field of Classification Search .............. 73/862.08, 73/862.381; 244/213–215
See application file for complete search history.

(56) References Cited

U.S. PATENT DOCUMENTS

| | | | |
|---|---|---|---|
| 3,782,167 A * | 1/1974 | Stuelpnagel | 73/1.77 |
| 4,688,744 A * | 8/1987 | Aldrich | 244/99.9 |
| 4,779,822 A * | 10/1988 | Burandt et al. | 244/99.9 |
| 4,892,274 A | 1/1990 | Pohl et al. | |
| 5,367,237 A | 11/1994 | Ring et al. | |
| 5,384,527 A | 1/1995 | Rozman et al. | |
| 5,500,564 A | 3/1996 | Sano et al. | |
| 5,743,490 A * | 4/1998 | Gillingham et al. | 244/99.9 |
| 5,875,998 A | 3/1999 | Gleine et al. | |
| 6,224,022 B1 | 5/2001 | Barba | |
| 6,382,566 B1 | 5/2002 | Ferrel et al. | |
| 6,400,050 B1 * | 6/2002 | Naman et al. | 310/68 B |
| 6,404,084 B1 | 6/2002 | Niki et al. | |
| 6,425,160 B1 * | 7/2002 | Saito | 15/250.22 |
| 7,048,234 B2 * | 5/2006 | Recksiek et al. | 244/213 |
| 7,437,955 B2 * | 10/2008 | Rennhack | 73/862.08 |
| 2002/0014127 A1 | 2/2002 | Ziavras | |
| 2005/0151027 A1 | 7/2005 | Recksiek et al. | |
| 2006/0185444 A1 * | 8/2006 | Rennhack | 73/862 |
| 2008/0054834 A1 * | 3/2008 | Nakamura | 318/560 |
| 2008/0258015 A1 * | 10/2008 | Thanhofer et al. | 244/224 |

FOREIGN PATENT DOCUMENTS

| | | |
|---|---|---|
| DE | 4033277 | 4/1992 |
| DE | 10301271 | 5/2004 |
| EP | 1 462 361 A1 | 9/2004 |

* cited by examiner

*Primary Examiner*—Lisa M Caputo
*Assistant Examiner*—Freddie Kirkland, III
(74) *Attorney, Agent, or Firm*—Lerner, David, Littenberg, Krumholz & Mentlik, LLP

(57) ABSTRACT

A device for determining the rotation angle of a shaft in an aircraft, the device having a shaft and a motor operable to rotate the shaft to operate a component and to detect first rotation data of the shaft. The device also includes a position pickup unit designed to detect second rotation data of the shaft, and a synchronization unit for synchronizing the first rotation data with the second rotation data.

12 Claims, 2 Drawing Sheets

DEVICE FOR DETERMINING THE ROTATION ANGLE OF A SHAFT IN AN AIRCRAFT

CROSS-REFERENCE TO RELATED APPLICATIONS

This application is a continuation, of U.S. application Ser. No. 11/358,529, filed on Feb. 21, 2006, which claims priority from U.S. Provisional Application No. 60/655,326 filed Feb. 23, 2005, all of which are incorporated herein by reference.

BACKGROUND OF THE INVENTION

The present invention relates to determining the rotation angle of a shaft in an aircraft. In particular the present invention relates to a device for determining the rotation angle of a shaft in an aircraft; to an aircraft comprising a corresponding device; to the use of a corresponding device in an aircraft; and to a method for determining the rotation angle of a shaft in an aircraft.

The system for operating a brake flap or a landing flap or landing slat in an aircraft forms part of the safety-critical systems within the aircraft. Nowadays electromechanical systems for operating the landing flaps or landing slats are used, which systems are designed so as to be redundant if need be and have proven to be highly reliable. In order to operate the landing flaps or landing slats, generally speaking mechanical shaft systems for transmission of the rotational forces are used. In order to prevent the occurrence of asymmetries in the flap positions and in order to still be able to adjust all the flaps should a drive motor fail, all flaps are connected to central shafting.

The position of the flaps is measured by way of two or even four independent position pickup units (PPUs) for each flap segment on the shaft. These sensors are located at the ends of the shaft part so as to detect differences in the absolute positions of the two shaft ends, and in this way provide information about the forces acting on the mechanism. In the normal state the servo motors are highly synchronised, in other words no forces act on the shaft.

If, in the case of a malfunction, one of the PPUs fails, in the state of the art the motor that is seated on the corresponding shaft end is switched off because it is no longer possible to measure the position, and because the motor would then not be synchronised. Possibly a so-called force fight between the two motors would develop, and at some stage the shaft would be destroyed. On the other hand this also means that a fault-free and properly functioning component (namely the motor) is switched off because of a malfunction of some other component so that the availability of the system may be thus reduced by 50%. Furthermore, the dynamics and agility of the system may be reduced by 50% because the remaining motor then runs only at half its possible rotary speed. In order to maintain synchronicity, the same also applies to the other wing.

SUMMARY OF THE INVENTION

Amongst other things, it may be an object of the present invention to, state improved rotation angle determination in an aircraft.

According to one embodiment of the present invention the above object may be met by means of a device for determining the rotation angle of a shaft in an aircraft, wherein the device comprises a shaft and a motor, wherein the motor is designed to rotate the shaft, and wherein the motor furthermore is designed to detect first rotation data in an absolute manner which first data correspond to a rotation angle of a first region of the shaft. The shaft may be designed for operating a device, selected from the group consisting of brake flap, landing flap or landing slat, rudder, aileron and elevator. Moreover, the device for determining the rotation angle of a shaft in an aircraft comprises a position pickup unit and a synchronisation unit, wherein the position pickup unit is designed to detect second rotation data, which data corresponds to a rotation angle of a second region of the shaft, and wherein the synchronisation unit is designed to synchronise the first rotation data with the second rotation data.

Measuring the rotation data or rotation angles by means of a drive motor ensures a simple and automatic rotation angle determination without having to provide additional detection devices. This may be ensured by installing drive motors which automatically measure their current positions internally and with high precision during operation.

Because of the provision of the position pickup unit and the motor detecting rotation data, a redundant system may be provided which measures rotation data even if, for example, one or all position pickup unit(s) should fail, because in this case the drive motor is still available for measuring rotation data. This results in a significant increase in the availability of the landing flap or landing slat or brake flap system. Even if all PPUs should fail it is not necessary to switch the motors off.

Because of the provision of the synchronisation unit it can be ensured that the zero points (in other words the positions of the first and second shaft regions at which rotation of the shaft regions has not yet taken place) of the position pickup unit and of the motor agree with each other. For example, in flight calibration of the motors can take place based on the data provided by the position pickup unit.

Due to the fact, that the shaft is designed for operating a device, selected from the group consisting of brake flap, landing flap or landing slat, rudder, aileron and elevator the control surfaces or flaps of the aircraft can be determined redundantly and in various ways (not only by way of the motor control system, but also by way of the corresponding position pickup units). Consequently, improved system safety or system availability of the control surface systems or flap systems may be ensured.

According to a further embodiment of the present invention the device further comprises a control unit, wherein the motor is designed to transmit the first rotation data to the control unit, and wherein the control unit is designed to control or regulate the rotation data of the shaft on the basis of the transmitted first rotation data.

According to this embodiment of the present invention, the motor can for example transmit the rotation angle of the first shaft region, which rotation angle has been measured by said motor, by way of a databus or a wireless connection or the like to the control unit, which is for example housed in the fuselage. Consequently it may be ensured that the on-board control unit always receives the current rotation data of the first shaft region.

According to a further embodiment of the present invention the position pickup unit is designed to transmit the second rotation data to the control unit, wherein the control unit is designed to control or regulate the rotation of the shaft on the basis of the transmitted first and second rotation data.

This may make it possible for the central control unit to always receive data that represents the rotation angle of the first shaft region and the rotation angle of the second shaft region. In this way the control unit has at any point in time sufficient information relating to the present positions of the two shaft regions available. Thus, the redundant design of the rotation data measuring devices may ensure excellent system safety.

According to a further embodiment of the present invention the control unit for controlling or regulating the rotation of the shaft is designed only on the basis of the transmitted first rotation data when the transmitted second rotation data is faulty or incomplete.

Therefore, improved system availability may be ensured to the extent that in the case of failure of all PPUs it is not necessary to switch the motors off because there is still sufficient rotation data of the shaft available.

According to a further embodiment of the present invention the control unit for controlling or regulating the rotation of the shaft is designed on the basis of the transmitted first and second rotation data, even if the transmitted second rotation data is faulty or incomplete.

According to this embodiment, for example, faulty or incomplete rotation data of the position pickup unit can be supplemented on the basis of the supplied rotation data of the motor so that in the final analysis a complete data set is available again.

According to a further embodiment of the present invention a method for determining the rotation angle of a shaft in an aircraft is stated. The shaft is rotated by a motor, and first rotation data that correspond to the rotation angle of a first region of the shaft is detected by the motor in an absolute manner. Moreover, second rotation data that corresponds to a second rotation angle of a second region of the shaft is detected by a position pickup unit. Subsequently, the first rotation data will be synchronised with the second rotation data.

According to this embodiment of the present invention a simple and quick method is stated in which rotation data of the shaft is automatically detected by way of its drive means, without there being a need to provide additional detection devices. This can not only lead to savings in cost and weight, but also to improved redundancy and therefore system availability.

Further embodiments of the present invention are stated in the subordinate claims and in the further independent claims.

Below, with reference to the figures, preferred embodiments of the present invention are described.

BRIEF DESCRIPTION OF THE DRAWINGS

In the drawings.

In the following description of the figures, the same reference characters are used for identical or similar elements.

DETAILED DESCRIPTION

Figure 1:
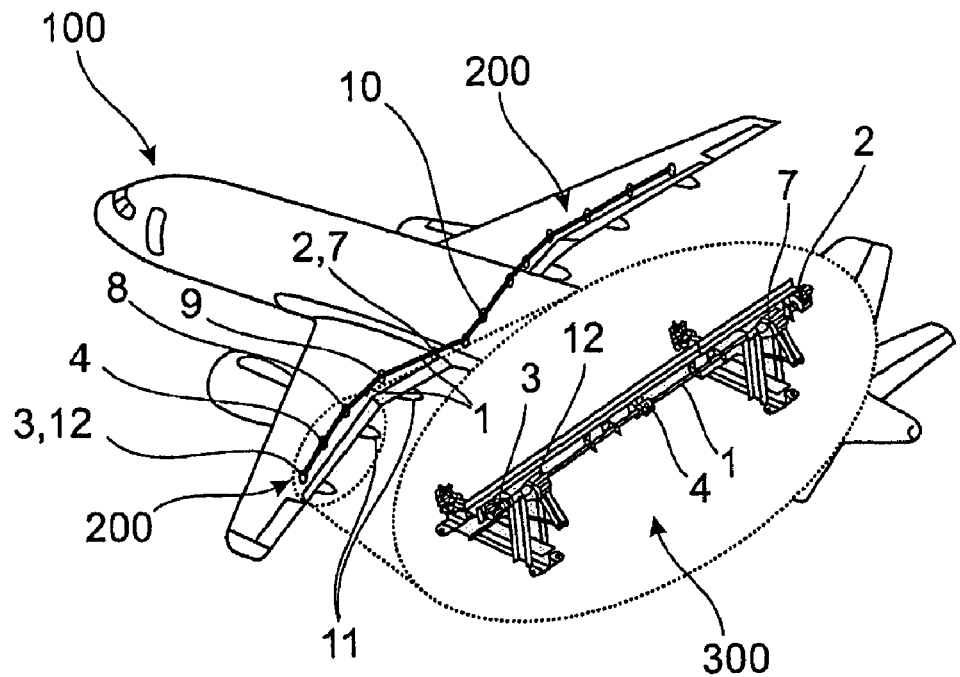
FIG. 1 shows a diagrammatic perspective illustration of an aircraft with a device according to one exemplary embodiment of the present invention.

FIG. 1 shows a diagrammatic perspective illustration of an aircraft with a device according to one embodiment of the present invention. As shown in FIG. 1, in both of its wings the aircraft 100 comprises a device 200 according to the invention, which device 200 is for example provided for operating the brake flaps or landing flaps or landing slats, or for operation of the ailerons or the like.

Figure 2:
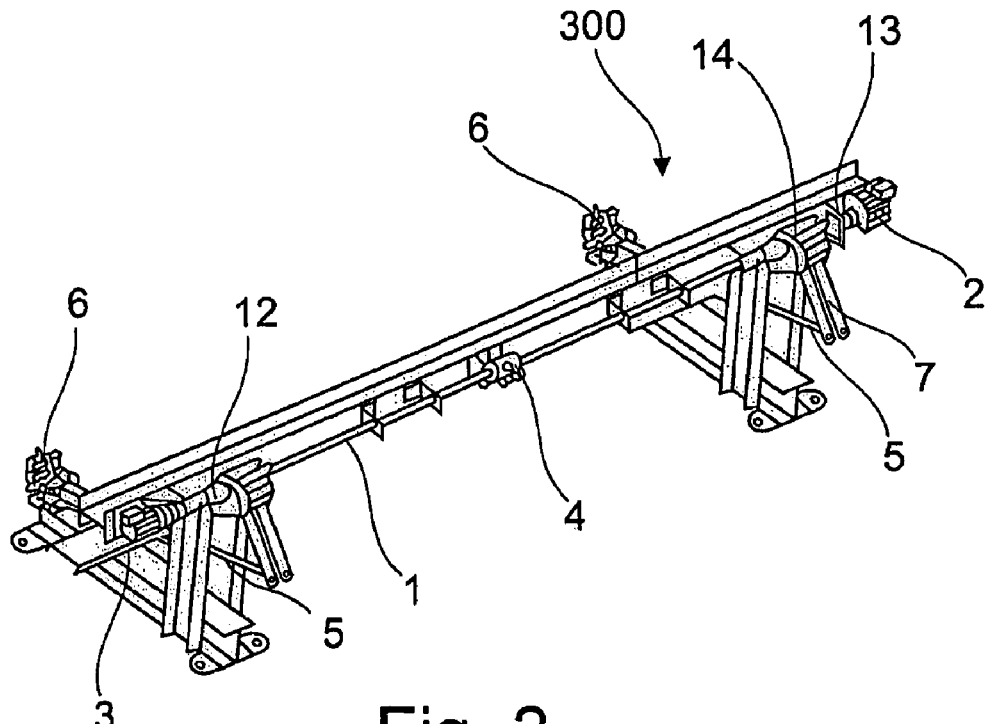
FIG. 2 shows a diagrammatic perspective illustration of a device for determining the rotation angle according to one exemplary embodiment of the present invention.
Figure 3:
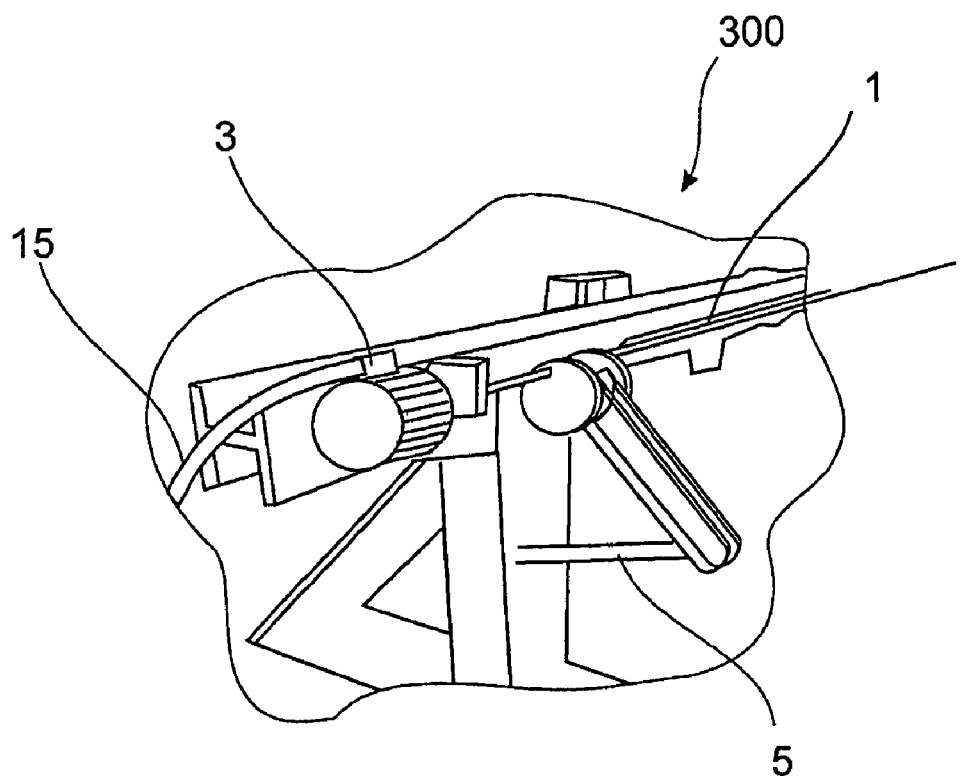
FIG. 3 shows a diagrammatic perspective detail of the device shown in FIG. 2.

The device 200 is also shown within a simulation model (not incorporated in an aircraft) 300, which simulation model 300 is shown in detail in FIGS. 2 and 3.

The device 200 comprises a shaft 1, two motors 2, 3 and a brake 4. Furthermore, rotation actuators 7, 8, 9, 12 are provided which, as is also the case with the motors 2, 3, make it possible to determine rotation data of the corresponding shaft sections.

The measuring data that is picked up by motors 2, 3 and actuators 7, 8, 9, 12 is supplied by way of corresponding data lines (not shown in FIG. 1) to a central power control unit (PCU) 10. There the data can be evaluated, and corresponding control signals or regulating signals can be made available to the flap motors or aileron motors.

FIG. 2 shows a diagrammatic perspective illustration of a device for determining the rotation angle according to one embodiment of the present invention. The device shown in FIG. 2, which device can for example be integrated in an aircraft wing, in the case of FIG. 2 is installed in a simulation model 300. The device comprises a shaft 1, motors 2 and 3, a system brake 4, a load-simulation cylinder 5 and servos 6 to simulate a flap resistance, actuators or position pickup units 7, 12, as well as a first shaft region 13 and a second shaft region 14.

The end regions of the shaft 1 are rotated by way of the two motors 2, 3 in order to operate the flaps or ailerons that are simulated by way of the cylinders 5 and servos 6. In this arrangement the rotation means of the corresponding shaft regions are measured by way of the actuators 7 and 12, and the corresponding measuring data is transmitted to the central control unit 10 (see FIG. 1). Furthermore, the rotation data of the shaft region near the motors 2, 3 is detected directly by the motors (during operation) and is also transmitted to the central control unit 10.

The motors used for adjusting the flaps measure the set positions internally with very high precision—much more precisely than is the case with presently available PPUs 7, 12. In this arrangement measuring the position data or rotation data takes place for example absolutely rather than incrementally. By way of corresponding data lines this position data is then transmitted to the control unit 10, rather than (as has been the case up to now) remaining within the motor units.

If the PPU data and the motor position data are supplied to the control unit 10, for example according to one embodiment of the present invention the motor position data can correspondingly be converted. This can for example take place following a calibration procedure which determines the zero point of the motor on the basis of the rotation data provided by the position pickup units 7, 12.

Consequently the rotation data measured by the motors 2, 3 is directly comparable with the PPU data, and in the case of failure or malfunction of a PPU, according to the invention the corresponding motor no longer needs to be switched off since positioning data is still available at the corresponding motor.

Furthermore, position data of a PPU, which furnishes data that is only slightly incorrect (bit hanger), can now be detected and evaluated or used accordingly, which has not been possible up to now.

According to one embodiment of the present invention the motor position data together with the data of the position pickup units 7, 12 is transmitted to the control unit 10 and every now and then is synchronised with the data from the position pickup unit. Consequently any motor drift that may occur can be calculated out.

If for example one of the PPUs 7, 12 fails, the rotation data or position data of the corresponding drive motor 3, 2 continues to be available so that conclusive information about the position of the corresponding shaft region and thus of any dynamic effect on the shaft can continue to be obtained and the motor does not have to be switched off.

According to one embodiment of the present invention the rotation data measured by the motors can be used to repair or supplement faulty or incompletely transmitted rotation data of the position pickup units 7, 12. This takes place for example within the control unit 10. Even if all position pickup units 7, 12 should fail, safe operation of the flap equipment or aileron equipment may still be ensured because there is still sufficient rotation data in relation to the corresponding shafts 1.

FIG. 3 shows a diagrammatic perspective detail of the device shown in FIG. 2. As shown in FIG. 3, the drive motor 2 is arranged on the end of the shaft 1 so as to rotate the shaft 1. The load cylinder 5 is used for simulating the forces acting on the flaps or ailerons, which forces are for example caused by air resistance.

By way of data lines and supply lines 15 it is for example possible to transmit rotation data measured by the motor 2 to the control unit 10 of FIG. 1. Of course this data transfer can also take place by way of additional data lines or wirelessly.

Figure 4:
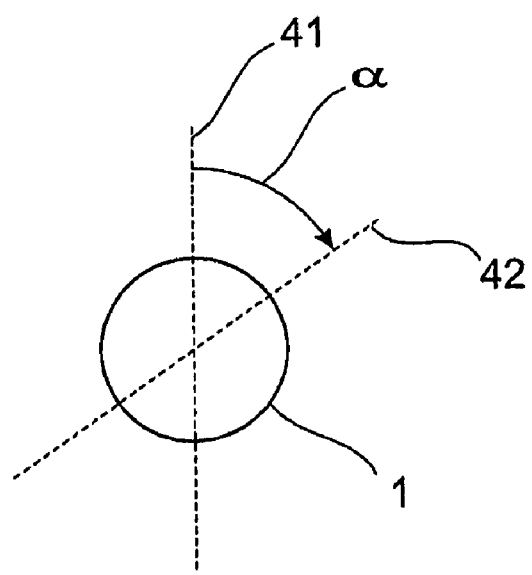
FIG. 4 shows a diagrammatic cross sectional illustration of a shaft for operating a brake flap in an aircraft.

FIG. 4 shows a diagrammatic cross sectional illustration of a shaft for operating a brake flap. As shown in FIG. 4 the shaft 1 comprises a home position 41 that is for example a folded-in position. In this position for example the motor 2 can be synchronised with the rotation data measured by the position pickup unit 12. By activating the motor 2 the shaft 1 then rotates by an angle α to a position 42. According to the invention this rotation angle α can be detected both by the motor 2 and by the position pickup unit 12. In this context the motor 3 and the position pickup unit 12 may be attached to the shaft so as to be in close proximity to each other so that they monitor the same shaft region. However, this is not mandatory. Instead, corresponding calibration procedures can be undertaken, e.g. at defined conditions, so that allocation of the motor measuring data to the position pickup unit data can for example take place in the control unit 10.

Implementation of the invention is not limited to the preferred embodiments shown in the figure. Instead, a multitude of variants are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

The invention claimed is:

1. An aircraft having a device for determining the rotation angle of a shaft in the aircraft, the device comprising:
    a shaft designed for operating a component, the component selected from the group consisting of a brake flap, a landing flap, a landing slat, a rudder, an aileron and an elevator, the shaft having a first region and a second region,
    a motor which rotates the shaft to detect first rotation data corresponding to a first rotation angle of the first region of the shaft, the motor being designed to carry out said detection in an absolute manner;
    a position pickup unit designed to detect second rotation data corresponding to a second rotation angle of the second region of the shaft;
    a synchronization unit designed to synchronize the first rotation data with the second rotation data; and
    a control unit designed to provide a calibration procedure which determines a zero point of the motor on the basis of the second rotation data provided by the position pickup unit.

2. The aircraft of claim 1,
    wherein the motor is designed to transmit the first rotation data to the control unit;
    wherein the control unit is designed to control or regulate the rotation of the shaft on the basis of the transmitted first rotation data.

3. The aircraft of claim 1,
    wherein the motor is designed to transmit the first rotation data to the control unit;
    wherein the position pickup unit is designed to transmit the second rotation data to the control unit;
    wherein the control unit is designed to control or regulate the rotation of the shaft on the basis of the transmitted first and second rotation data.

4. The aircraft of claim 3,
    wherein the control unit is designed control or regulate the rotation of the shaft only on the basis of the transmitted first rotation data when the transmitted second rotation data is faulty or incomplete.

5. The aircraft of claim 3,
    wherein the control unit is designed to control or regulate the rotation of the shaft on the basis of the transmitted first and second rotation data, even if the transmitted second rotation data is faulty or incomplete.

6. An aircraft having a device for determining the rotation angle of a shaft in the aircraft, the device comprising:
    a shaft designed for operating a component the component selected from the group consisting of a brake flap, a landing flap, a landing slat, a rudder, an aileron and an elevator, the shaft having a first region and a second region,
    a motor which rotates the shaft to detect first rotation data corresponding to a first rotation angle of the first region of the shaft, the motor being designed to carry out said detection in an absolute manner;
    a position pickup unit designed to detect second rotation data corresponding to a second rotation angle of the second region of the shaft;
    a synchronization unit designed to synchronize the first rotation data with the second rotation data; and
    a control unit designed to detect and evaluate an incorrectness of the second rotation data provided by the position pickup unit on the basis of the first rotation data.

7. The aircraft of claim 6,
    wherein the motor is designed to transmit the first rotation data to the control unit;
    wherein the control unit is designed to control or regulate the rotation of the shaft on the basis of the transmitted first rotation data.

8. The aircraft of claim 6,
    wherein the motor is designed to transmit the first rotation data to the control unit;
    wherein the position pickup unit is designed to transmit the second rotation data to the control unit;
    wherein the control unit is designed to control or regulate the rotation of the shaft on the basis of the transmitted first and second rotation data.

9. The aircraft of claim 8, wherein the control unit is designed control or regulate the rotation of the shaft only on the basis of the transmitted first rotation data when the transmitted second rotation data is faulty or incomplete.

10. The aircraft of claim 8, wherein the control unit is designed to control or regulate the rotation of the shaft on the basis of the transmitted first and second rotation data, even if the transmitted second rotation data is faulty or incomplete.

11. A method for determining the rotation angle of a shaft in an aircraft, comprising the steps of:

rotating the shaft by a motor;

detecting first rotation data that corresponds to a first rotation angle of a first region of the shaft by the motor in an absolute manner;

detecting second rotation data that corresponds to a second rotation angle of a second region of the shaft by a position pickup unit;

transmitting the first rotation data from the motor to a control unit;

transmitting the second rotation data from the position pickup unit to the control unit;

determining a zero point of the motor on the basis of the second rotation data provided by the position pickup unit;

synchronizing the first rotation data with the second rotation data; and controlling or regulating the rotation of the shaft on the basis of the transmitted first and second rotation data by the control unit.

12. A method for determining the rotation angle of a shaft in a aircraft, comprising the steps of:

rotating the shaft by a motor;

detecting first rotation data that corresponds to a first rotation angle of a first region of the shaft by the motor in an absolute manner;

detecting second rotation data that corresponds to a second rotation angle of a second region of the shaft by a position pickup unit;

transmitting the first rotation data from the motor to a control unit;

transmitting the second rotation data from the position pickup unit to the control unit;

detecting and evaluating an incorrectness of the second rotation data provided by the position pickup unit on the basis of the first rotation data;

synchronizing the first rotation data with the second rotation data; and controlling or regulating the rotation of the shaft on the basis of the transmitted first and second rotation data by the control unit.

* * * * *

UNITED STATES PATENT AND TRADEMARK OFFICE
CERTIFICATE OF CORRECTION

PATENT NO. : 7,644,634 B2  
APPLICATION NO. : 12/231794  
DATED : January 12, 2010  
INVENTOR(S) : Joern Rennhack Page 1 of 1

It is certified that error appears in the above-identified patent and that said Letters Patent is hereby corrected as shown below:

Col. 1, Line 61, delete "," after "invention to"

Col. 2, Line 4, delete "," after "a device"

Col. 2, Line 36, delete "," after "device"

Col. 6, Line 25, insert --to-- after "control unit is designed"

Col. 6, Line 36, insert --,-- after "operating a component"

Col. 7, Line 2, insert --to-- after "control unit is designed"

Col. 8, Line 7, replace "in a aircraft" with --in an aircraft--

Signed and Sealed this  
Fifteenth Day of March, 2011

David J. Kappos  
*Director of the United States Patent and Trademark Office*